United States Patent
Lee et al.

(10) Patent No.: US 12,551,918 B2
(45) Date of Patent: Feb. 17, 2026

(54) SHIM FOR DIE COATER, DIE COATER COMPRISING SAME, AND LITHIUM SECONDARY BATTERY COMPRISING CATHODE MANUFACTURED USING SAME

(71) Applicant: LG Energy Solution, Ltd., Seoul (KR)

(72) Inventors: Young Jun Lee, Daejeon (KR); Seung Seo Park, Daejeon (KR); Jae I Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 629 days.

(21) Appl. No.: 17/913,343

(22) PCT Filed: Oct. 14, 2021

(86) PCT No.: PCT/KR2021/014271
§ 371 (c)(1),
(2) Date: Sep. 21, 2022

(87) PCT Pub. No.: WO2022/097950
PCT Pub. Date: May 12, 2022

(65) Prior Publication Data
US 2023/0149968 A1 May 18, 2023

(30) Foreign Application Priority Data
Nov. 3, 2020 (KR) ......................... 10-2020-0145292

(51) Int. Cl.
*B05C 5/02* (2006.01)
*H01M 4/04* (2006.01)

(52) U.S. Cl.
CPC ......... *B05C 5/0254* (2013.01); *H01M 4/0404* (2013.01)

(58) Field of Classification Search
None
See application file for complete search history.

(56) References Cited

U.S. PATENT DOCUMENTS

| | | | |
|---|---|---|---|
| 11,951,508 B2* | 4/2024 | Choi | B05C 5/0262 |
| 12,280,394 B2* | 4/2025 | Horinouchi | B05D 1/34 |
| 2002/0197535 A1* | 12/2002 | Dudley | H01M 6/40 427/407.1 |
| 2012/0214036 A1 | 8/2012 | Kim | |
| 2015/0053133 A1 | 2/2015 | Park et al. | |
| 2015/0380716 A1 | 12/2015 | Zama et al. | |
| 2020/0136133 A1* | 4/2020 | Umehara | H01M 10/052 |
| 2020/0144657 A1* | 5/2020 | Kifune | H01M 4/139 |
| 2021/0151732 A1* | 5/2021 | Ahn | B29C 48/305 |
| 2022/0158190 A1 | 5/2022 | Sato et al. | |
| 2023/0061304 A1* | 3/2023 | Sato | B05C 5/0254 |
| 2023/0079707 A1* | 3/2023 | Lee | H01M 4/139 118/407 |
| 2023/0120286 A1* | 4/2023 | Hong | H01M 4/139 409/131 |
| 2023/0140800 A1* | 5/2023 | Lee | H01M 4/0411 118/315 |
| 2023/0290993 A1* | 9/2023 | Mita | H01M 10/0587 |
| 2023/0395807 A1* | 12/2023 | Kato | H01M 10/052 |
| 2024/0024911 A1* | 1/2024 | Park | H01M 4/0404 |
| 2024/0058834 A1* | 2/2024 | Park | H01M 4/0402 |
| 2024/0116072 A1* | 4/2024 | Moon | H01M 4/0404 |
| 2024/0149292 A1* | 5/2024 | Park | B05C 9/06 |
| 2024/0207885 A1* | 6/2024 | Park | B05C 5/0254 |
| 2024/0299970 A1* | 9/2024 | Jo | B05C 5/0254 |
| 2025/0050372 A1* | 2/2025 | Park | B05C 5/0254 |
| 2025/0091084 A1* | 3/2025 | Park | H01M 4/0409 |
| 2025/0174660 A1* | 5/2025 | Yoon | H01M 4/1393 |

FOREIGN PATENT DOCUMENTS

| | | | | |
|---|---|---|---|---|
| CN | 104487176 A | 4/2015 | | |
| CN | 207765534 U | 8/2018 | | |
| CN | 208127303 U | 11/2018 | | |
| CN | 211026907 U | 7/2020 | | |
| CN | 211726368 U | 10/2020 | | |
| EP | 3928878 A1 | 12/2021 | | |
| JP | 2006255643 A | 9/2006 | | |
| JP | 2014233651 A | * 12/2014 | ............... | A61F 5/41 |
| JP | 2015136675 A | 7/2015 | | |
| JP | 6249493 B2 | 12/2017 | | |
| KR | 20120096302 A | 8/2012 | | |
| KR | 20150133206 A | 11/2015 | | |
| KR | 101801422 B1 | 11/2017 | | |
| KR | 101841346 B1 | 3/2018 | | |
| KR | 20190021698 A | 3/2019 | | |
| KR | 20200035642 A | 4/2020 | | |
| KR | 20210083512 A | 7/2021 | | |
| WO | 2020188707 A1 | 9/2020 | | |

OTHER PUBLICATIONS

JP-2014233651-A Machine Translation (Year: 2014).*
JP-2014233651-A Abstract Translation (Year: 2014).*
International Search Report for PCT/KR2021/014271 mailed Jan. 26, 2022. 4 pgs.
Extended European Search Report including Written Opinion for Application No. 21889415.2 dated Jul. 3, 2024, pp. 1-10.

* cited by examiner

*Primary Examiner* — Kevin M Bernatz
(74) *Attorney, Agent, or Firm* — Lerner David LLP

(57) ABSTRACT

The present technology relates to a shim for a die coater, a die coater including the shim, and a lithium secondary battery including a positive electrode manufactured using the die coater of the present invention, and according to the present technology, it is possible to smoothly apply slurry on the edge portion.

11 Claims, 7 Drawing Sheets

[FIG. 1]

-- Prior Art --

SHIM FOR DIE COATER, DIE COATER COMPRISING SAME, AND LITHIUM SECONDARY BATTERY COMPRISING CATHODE MANUFACTURED USING SAME

CROSS-REFERENCE TO RELATED APPLICATIONS

This application is a national stage entry under 35 U.S.C. § 371 of International Application No. PCT/KR2021/014271, filed on Oct. 14, 2021, which claims priority to Korean Patent Application No. 10-2020-0145292, filed on Nov. 3, 2020, the disclosures of which are hereby incorporated herein by reference in their entireties.

The present invention relates to a shim for a die coater, a die coater including the shim, and a lithium secondary battery including a positive electrode manufactured using the die coater.

BACKGROUND ART

A secondary battery can be recharged and may be formed in a small size or as a large capacity. Accordingly, a lot of researches and developments secondary batteries are currently in progress. Such secondary batteries are manufactured as a form in which one battery cell is packed as a pack or tens of battery cells are connected as a pack, and are widely used for a mobile phone, a notebook computer, and a power source for driving a motor of an electric vehicle.

An electrode of a secondary battery is manufactured by applying slurry, which is obtained by mixing an active material with a conductive agent, on a metal foil, drying and pressing the metal foil. A die coater for electrode production is equipment for applying slurry on a metal foil.

A die coater is a device which supplies a fluid (slurry, an adhesive, a hard coating agent, ceramic, etc.) with fluidity to a space between upper and lower dies by using a pulseless pump or a piston pump, and coats the supplied fluid on an object such as a fabric, a film, a glass plate, or a sheet to have a constant thickness.

Figure 1:
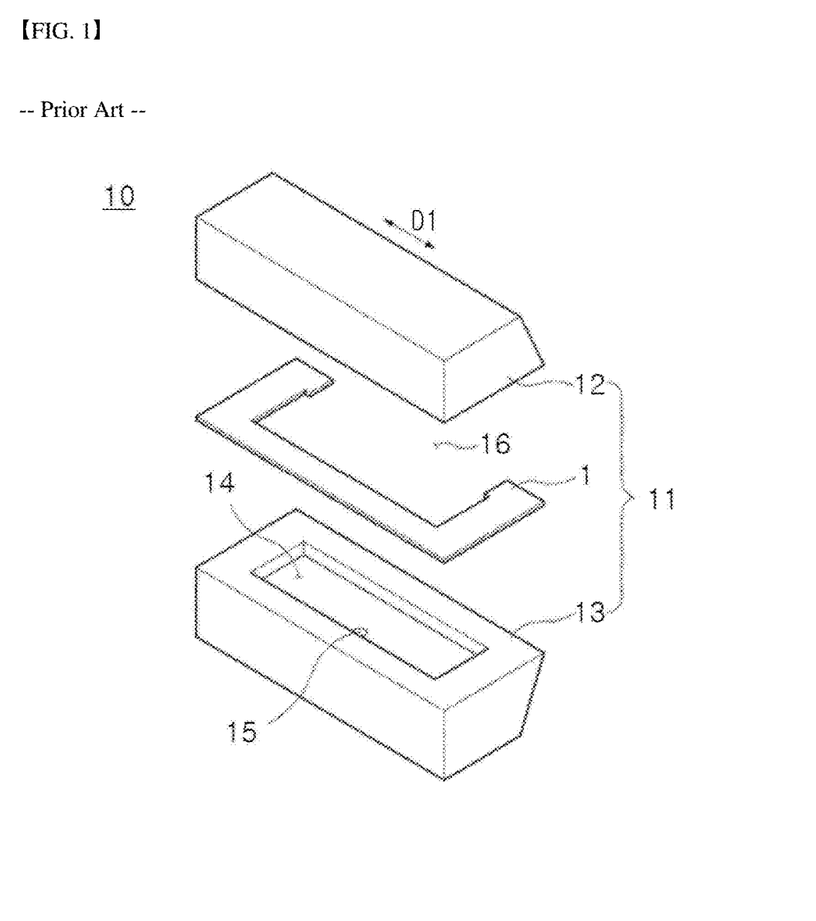
FIG. 1 is an exploded perspective view showing a decomposition state of a conventional die coater for electrode production.

FIG. 1 is an exploded perspective view showing a decomposition state of a conventional die coater for electrode production. Referring to FIG. 1, a die coater 10 includes a supply port 15 through which a slurry is supplied to a slot die. The slurry supplied from a supply port 15 is moved into a body 11 having an inner space 14 which is connected to the supply port 15 and accommodates slurry. The body 11 includes an upper die 12, a lower die 13, and a shim 1 located between the upper die 12 and the lower die 13. A discharge port 16 is prepared in the body 11 so that slurry may be discharged from the inner space 14 of the body 11 to the external side. The discharge port 16 has a thin and wide shape so that slurry may be widely coated on a metal foil. The slurry supplied from the supply port 15 is widely spread in a width direction of the discharge port 16 in the inner space of the body 11 and is then discharged through the discharge port 16. As such, a slurry can be coated on an electrode current collector.

As such, in a manufactured electrode, there was little difference in the thickness of slurry between the central portion and the edge portion along the cross-section in the width direction. However, the NP ratio of a local portion may be reversed, depending on the electrode used at the time of manufacturing a secondary battery. Hence, there is a need for a technology capable of reducing the NP ratio reversal phenomenon by controlling the length, shape, etc. of the coating boundary surface of slurry at the time of manufacturing an electrode. Particularly, there is a need for a technology capable of smoothly applying slurry on the edge portion when applying slurry on a positive electrode current collector at the time of manufacturing a positive electrode.

DISCLOSURE

Technical Problem

The present invention is believed to solve at least some of the above problems. For example, an aspect of the present invention provides a shim for a die coater capable of smoothly applying slurry on an edge portion, a die coater including the shim, and a lithium secondary battery including a positive electrode manufactured using the die coater.

Technical Solution

The present invention provides a shim for a die coater. In one example, a shim for a die coater according to the present invention relates to a shim for a die coater which applies a slurry on an electrode current collector and includes: first and second guides having one end bent and extended; and a base which connects other ends of the first and second guides to each other. At this time, the first and second guides have a step along a discharge line of a slurry.

In one example, the first and second guides have a step at a portion corresponding to 3/10 to 6/10 of an entire thickness of the first and second guides. In a specific example, in the first and second guides, an average thickness of regions where a step is not formed is in a range of 1 to 2 mm, and an average thickness of regions where a step is formed is in a range of 0.4 to 0.9 mm.

In another example, the shim according to the present invention further includes at least one sub-guide which is located between the first and second guides and divides the discharge line. In a specific example, the sub-guide has a step along the discharge line of the slurry.

Further, the sub-guide may have a step at a portion corresponding to 3/10 to 6/10 of an entire thickness of the sub-guide, and in the sub-guide, an average thickness of regions where a step is not formed may be in a range of 1 to 2 mm, and an average thickness of regions where a step is formed may be in a range of 0.4 to 0.9 mm.

Further, the present invention provides a die coater including the above-described shim for a die coater.

In one example, the die coater includes: a body which has an inner space for accommodating a slurry; a supply port through which a slurry is supplied to the inner space; and a discharge port through which a slurry is discharged from the inner space to an electrode current collector. Herein, the shim for the die coater may be detachably installed at the inner space of the die coater.

Further, the present invention provides a lithium secondary battery including a positive electrode manufactured by the above-described die coater. In one example, a lithium secondary battery according to the present invention includes: a positive electrode in which a positive electrode slurry is applied on a positive electrode current collector; a negative electrode in which a negative electrode slurry is applied on a negative electrode current collector; and a separator interposed between the positive electrode and the negative electrode. In a specific example, a thickness difference between a central portion of the positive electrode slurry and an edge portion of the positive electrode slurry along the cross-section in the width direction is 10% or more, and a thickness difference between a central portion of the negative electrode slurry and an edge portion of the negative electrode slurry along the cross-section in the width direction is 5% or less.

In one example, a ratio of the thickness of the edge portion of the positive electrode slurry to the thickness of the central portion of the positive electrode slurry is in a range of 80 to 90%, and a ratio of the thickness of the edge portion of the positive electrode slurry to the thickness of the central portion of the negative electrode slurry is in a range of 95 to 105%.

Advantageous Effects

According to a shim for a die coater, a die coater including the shim, and a lithium secondary battery including a positive electrode manufactured using the die coater of the present invention, it is possible to smoothly apply slurry on the edge portion.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

The present invention relates to a shim for a die coater, a die coater including the shim, and a lithium secondary battery including the positive electrode manufactured using the die coater.

As described above, when slurry was coated on an electrode current collector using a conventional die coater, there was little difference in thickness of slurry between the central portion and the edge portion along the cross-section in the width direction in the manufactured electrode. However, the NP ratio of a local portion was reversed in some cases, depending on the electrode used at the time of manufacturing a secondary battery.

As such, the inventors of the present invention invented a shim for a die coater capable of reducing a NP ratio reversal phenomenon, a die coater including the shim, and a lithium secondary battery including the positive electrode manufactured using the die coater, by controlling the length, shape, etc. of the coating boundary surface of slurry at the time of manufacturing an electrode. Specifically, the guide of the shim for a die coater according to the present invention has a step on the boundary surface of the discharge line, through which slurry is discharged, to thereby allow slurry to be smoothly applied on the edge portion of the electrode current collector.

Hereinafter, a shim for a die coater, a die coater including the shim, and a lithium secondary battery including the positive electrode manufactured using the die coater according to the present invention will be described in detail.

The present invention provides a shim for a die coater. In one example, a shim for a die coater according to the present invention relates to a shim for a die coater which applies a slurry on an electrode current collector and includes: first and second guides having one end bent and extended; and a base which connects other ends of the first and second guides to each other. At this time, the first and second guides have a step along a discharge line of a slurry.

It means that a step is formed on the boundary surface with the discharge line in the first and second guides, and the step is formed on the inner surface of first and second guides contacting the slurry. In a specific example, the boundary surface with the discharge line ace are formed to be lower, compared to the entire thickness of the first and second guides. This is to smoothly apply slurry on an edge portion when coating slurry.

In one example, a shim for a die coater according to the present invention has a plate shape. One side of the shim is opened, and the other side is closed. At this time, a slurry can be discharged through an opened region of the shim for a die coater. Further, the base can close the other end of the shim for a die coater by connecting other ends of the first and second guides to each other. In a specific example, the shim for a die coater according to the present invention is preferably made of a material having sealability except for an opened region as it also plays a role of a gasket which prevents leakage of slurry form the die coater.

In one example, the first and second guides are installed at one side of the base to be spaced apart from each other and are directed in the same direction to be parallel to each other. Specifically, a region between the first and second guides is a region where slurry is discharged, and the first and second guides form the discharge line of slurry.

In one example, the base connects other ends of the first and second guides to each other and is formed in a simple straight line form. However, the present invention is not limited thereto.

In one example, the first and second guides have a step along a discharge line of a slurry. In a specific example, the first and second guides have a step on the boundary surface with the discharge line, and when slurry discharges, the step is formed on the inner surface of the first and second guides contacting the slurry. Namely, the thickness of the boundary surfaces of the first and second guides with the discharge line are set to be smaller than the entire thickness of the first and second guides. This is to smoothly apply slurry on an edge portion when coating slurry.

In one example, the first and second guides have a step at a portion corresponding to 3/10 to 6/10 of an entire thickness of the first and second guides. Alternatively, the first and second guides have a step at a portion corresponding to 4/10 to 5/10 of an entire thickness of the first and second guides. In a specific example, in the first and second guides, an average thickness of regions where a step is not formed is in a range of 1 to 2 mm, and an average thickness of regions where a step is formed is in a range of 0.4 to 0.9 mm. Alternatively, in the first and second guides, an average thickness of regions where a step is not formed may be in a range of 1.4 to 1.8 mm, and an average thickness of regions where a step is formed may be in a range of 0.5 to 0.8 mm. For example, in the first and second guides, an average thickness of regions where a step is not formed may be 1.6 mm, and an average thickness of regions where a step is formed may be in a range of 0.5 to 0.7 mm. Namely, the shim for a die coater according to the present invention can control the length and shape of the edge portion of the slurry coated on the electrode current collector by making the thickness of the boundary surface of the slurry discharge line of first and second guides.

In another example, the shim according to the present invention further includes at least one sub-guide which is located between the first and second guides and divides the discharge line. Herein, if the shim for a die coater according to the present invention includes n sub-guides, (n+1) discharge lines can be formed. Herein, 1 to 10 sub-guides may be included. For example, 3 sub-guides may be included. If 3 sub-guides are included between the first and second guides, the shim for a die coater according to the present invention may form 4 discharge lines. Further, sub-guides are included between the first and second guides in order to alternately stripe-coating the coated part and the non-coated part at the time of coating slurry.

In another example, the sub-guide has a step along a discharge line of a slurry. In a specific example, the sub-guide has a step formed on the boundary surface with the discharge line of slurry, and when slurry is discharged, the step is formed on the side surface of the sub-guide contacting the slurry. Namely, the thickness of the boundary surface with the discharge line is set to be smaller than the entire thickness of the sub-guide. This is to smoothly apply slurry on the edge portion when coating slurry as in the first and second guides.

The sub-guide may have a step at a portion corresponding to 3/10 to 6/10 of an entire thickness of the sub-guide. Alternatively, the sub-guide may have a step at a portion corresponding to 4/10 to 5/10 of an entire thickness of the sub-guide. In a specific example, in the sub-guide, an average thickness of regions where a step is not formed is in a range of 1 to 2 mm, and an average thickness of regions where a step is formed is in a range of 0.4 to 0.9 mm. Alternatively, in the sub-guide, an average thickness of regions where a step is not formed may be in a range of 1.4 to 1.8 mm, and an average thickness of regions where a step is formed may be in a range of 0.5 to 0.8 mm. For example, in the first and second guides, an average thickness of regions where a step is not formed may be 1.6 mm, and an average thickness of regions where a step is formed may be in a range of 0.5 to 0.7 mm. Further, the thickness of the step of the sub-guide may correspond to the thickness of the step of the first and second guides.

Further, the present invention provides a die coater including the above-described shim for a die coater.

In one example, the die coater includes: a body which has an inner space for accommodating a slurry; a supply port through which a slurry is supplied to the inner space; and a discharge port through which a slurry is discharged from the inner space to an electrode current collector. Herein, the shim for the die coater may be detachably installed at the inner space of the die coater.

In one example, the body of the die coater includes an upper die and a lower die. Specifically, the upper and lower dies have a symmetrical prismoid shape, and may be assembled as one surface of the upper and lower dies, which is the bottom surface of the prismoid, faces each other.

Further, the lower die may include a supply port through which a slurry is supplied from an external side. The slurry, which is supplied from the external side through the supply port, may be stored in an inner space formed in the lower die.

In one example, a shim for a die coater according to the present invention is interposed between the upper die and the lower die. In a specific example, the slurry discharge line is formed at the inside of the die coater as the upper die and the lower die are spaced apart from each other by the thickness of the shim for a die coater. For example, slurry supplied from the supply port flows in the die coater along the discharge line and may be discharged to the outside through the discharge port.

Further, as described above, the shim for a die coater includes a first guide, a second guide, and a sub-guide where a step is formed along the discharge line, to thereby control the length and shape of the edge portion of the slurry. Since the first and second guides were explained above, the detailed description for the first and second guides is omitted here.

Further, the present invention provides a lithium secondary battery including the positive electrode manufactured by the above-described die coater.

In one example, a lithium secondary battery according to the present invention includes: a positive electrode in which a positive electrode slurry is applied on a positive electrode current collector; the negative electrode in which the negative electrode slurry is applied on the negative electrode current collector; and a separator interposed between the positive electrode and the negative electrode.

First, the positive electrode current collector may contain at least one of aluminum, nickel, and their alloys. The electrode current collector used for the positive electrode is a metal having high conductivity, and any metal which the positive electrode active material slurry may be easily attached to and which is not reactive in the voltage range of the electrochemical device can be used. In this case, the slurry of the mixture layer may contain a positive electrode active material. The positive electrode active material may be a lithium-containing oxide, and a transition metal oxide containing lithium may be used as the lithium-containing oxide. For example, the lithium-containing transition metal oxide may be any one or a mixture of two or more selected from the group consisting of $Li_xCoO_2(0.5<x<1.3)$, $Li_xNiO_2$ $(0.5<x<1.3)$, $Li_xMnO_2(0.5<x<1.3)$, $Li_xMn_2O_4$ $(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}CO_yO_2(0.5<x<1.3, 0<y<1)$, $Li_xCo_{1-y}Mn_yO_2$ (0.5<x<1.3, 0≤y<1), $Li_xNi_{1-y}Mn_yO_2$(0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$(0.5<x<1.3, 0<<2), $Li_xMn_{2-z}Co_zO_4$(0.5<x<1.3, 0<<2), $Li_xCoPO_4$(0.5<x<1.3) and $Li_xFePO_4$(0.5<x<1.3), and the lithium-containing transition metal oxide may be coated with a metal or metal oxide such as aluminum (Al). Further, in addition to the lithium-containing transition metal oxide, sulfide, selenide, and halide may be used.

In a specific example, the positive electrode active material layer according to the present invention includes an active material component represented by Chemical Formula 1 below.

[Chemical formula 1]

In Chemical Formula 1, the value a is 0.6 or more, specifically 0.8 or more. In the Formula 1, as the value a increases, the value b and/or value c decrease within the range satisfying the above Formula 1.

Further, the negative electrode current collector may contain at least one of copper, gold, nickel, and their alloys. For example, the electrode current collector may be made of copper. In this case, the slurry of the mixture layer may contain the negative electrode active material. The negative electrode active material may include a carbon material, lithium metal, silicon or tin. When a carbon material is used as the negative electrode active material, both low crystalline carbon and high crystalline carbon may be used. Representative examples of low crystalline carbon include soft carbon and hard carbon. Representative examples of high crystalline carbon include natural graphite, Kish graphite, pyrolytic carbon, mesophase pitch based carbon fiber, mesocarbon microbeads, mesophase pitches, and high-temperature calcined carbons such as petroleum or coal tar pitch derived cokes.

Further, the slurry may include a conductive material and a binder which are commonly used in the related field.

The separator may be made of any porous substrate used in a lithium secondary battery, and for example, a polyolefin-based porous membrane or a nonwoven fabric may be used, but the present invention is not particularly limited thereto.

Examples of the polyolefin-based porous membrane include polyethylene such as high density polyethylene, linear low density polyethylene, low density polyethylene, ultra-high molecular weight polyethylene, and a membrane in which polyolefin-based polymers, such as polypropylene, polybutylene, or polypentene, are each formed alone or in a mixture thereof.

Polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalene, etc. may be used individually or as a polymer by a mixture thereof, to thereby form the non-woven fabric, in addition to polyolefin-based nonwoven fabric.

Further, in the lithium secondary battery according to the present invention, a thickness difference between a central portion of the positive electrode slurry and an edge portion of the positive electrode slurry along the cross-section in the width direction is 10% or more, and a thickness difference between a central portion of the negative electrode slurry and an edge portion of the negative electrode slurry along the cross-section in the width direction is 5% or less. This means when manufacturing the positive electrode, slurry is smoothly applied on the edge portion when coating slurry.

In a specific example, a ratio of the thickness of the edge portion of the positive electrode slurry to the thickness of the central portion of the positive electrode slurry may be in a range of 80 to 90%, and a ratio of the thickness of the edge portion of the positive electrode slurry to the thickness of the central portion of the negative electrode slurry may be in a range of 95 to 105%.

In conclusion, in a lithium secondary battery manufactured according to the present invention, it is possible to control the length and shape of the edge region of slurry coated on a positive electrode current collector. As such, the NP ratio reversal risk, etc. can be reduced by increasing the length of the coating boundary surface of slurry.

DETAILED DESCRIPTION OF THE PREFERRED EMBODIMENTS

Hereinafter, the present invention will be described in more detail through drawings and the like. As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

First Embodiment

Figure 2:
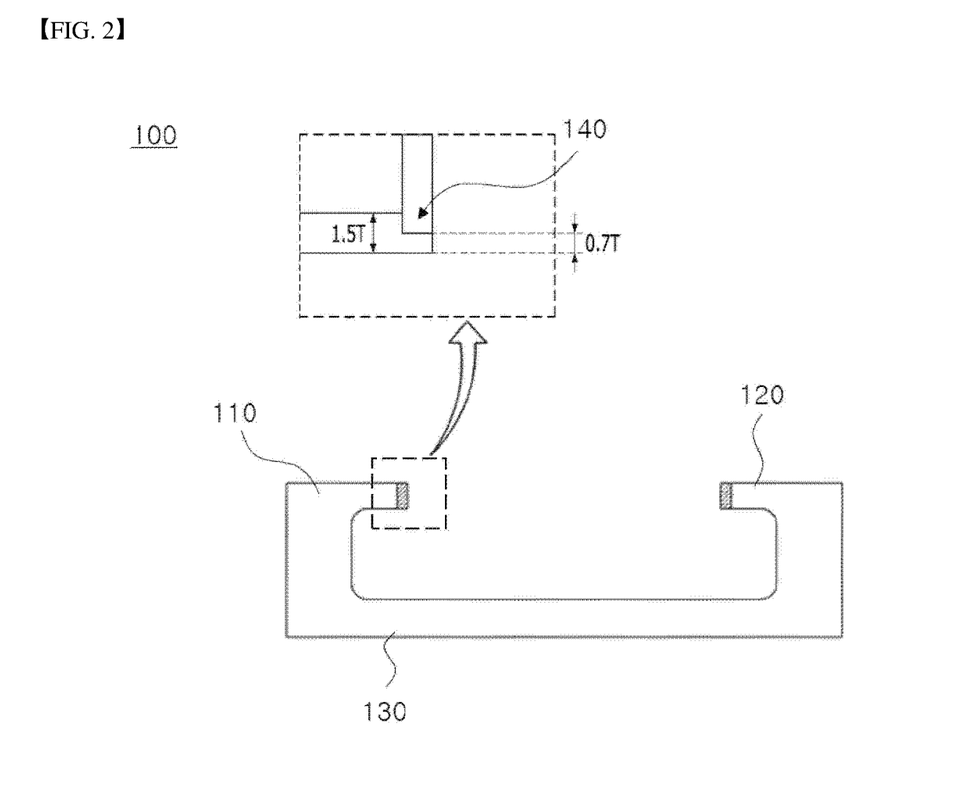
FIG. 2 is a schematic diagram of a shim for a die coater according to one embodiment of the present invention.

FIG. 2 is a schematic diagram of a shim for a die coater according to one embodiment of the present invention. Referring to FIG. 2, a shim 100 for a die coater according to the present invention relates to a shim for a die coater which applies a slurry on an electrode current collector and includes: first and second guides 110 and 120 having one end bent and extended; and a base 130 which connects other ends of the first and second guides 110 and 120 to each other.

Specifically, the shim 100 for a die coater has a plate shape. One side of the shim 100 is opened, and the other side is closed. At this time, a slurry can be discharged through an opened region of the shim 100 for a die coater. Further, the base 130 can close the other end of the shim 100 for a die coater by connecting other ends of the first and second guides 110 and 120 to each other. Further, the shim 100 for a die coater is preferably made of a material having sealability except for an opened region as it also plays a role of a gasket which prevents leakage of slurry from the die coater.

The first and second guides 110 and 120 are installed at one side of the base 130 to be spaced apart from each other and are directed in the same direction to be parallel to each other. Specifically, a region between the first and second guides 110 and 120 is a region where slurry is discharged, and the first and second guides 110 and 120 form the discharge line of slurry.

Further, the base 130 connects other ends of the first and second guides 110 and 120 to each other and is formed in a simple straight line form. However, the present invention is not limited thereto.

Further, the first and second guides 110 and 12 have a step 140 along a discharge line of a slurry. Specifically, the first and second guides 110 and 120 have a step 140 on the boundary surface with the discharge line, and when slurry is discharged, the step 140 is formed on the inner surface of the first and second guides 110 and 120 contacting the slurry. Namely, the thickness of boundary surface with the discharge line is set to be smaller than the entire thickness of the first and second guides 110 and 120. This is to smoothly apply slurry on an edge portion when coating slurry.

The first and second guides have a step 140 at a portion corresponding to 3/10 to 6/10 of an entire thickness of the first and second guides 110 and 120. Specifically, in the first and second guides 120 and 130 of the shim 100 for a die coater according to the present invention, an average thickness of regions where a step 130 is not formed is 1.5 mm, and an average thickness of regions where a step 140 is formed is 0.7 mm. However, the present invention is not limited thereto.

Namely, the shim 100 for a die coater according to the present invention can control the length and shape of the edge portion of the slurry coated on the electrode current collector by making the thickness of the boundary surface of the slurry discharge line of first and second guides 110 and 120. As such, the NP ratio reversal risk, etc. can be reduced by increasing the length of the coating boundary surface of slurry.

Second Embodiment

Figure 3:
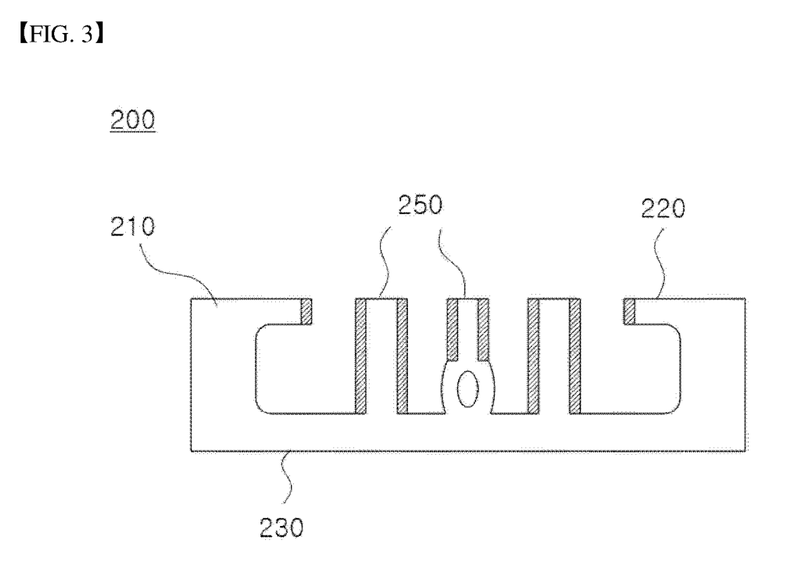
FIGS. 3 to 4 are schematic diagrams of a shim for a die coater according to another embodiment of the present invention.
Figure 4:
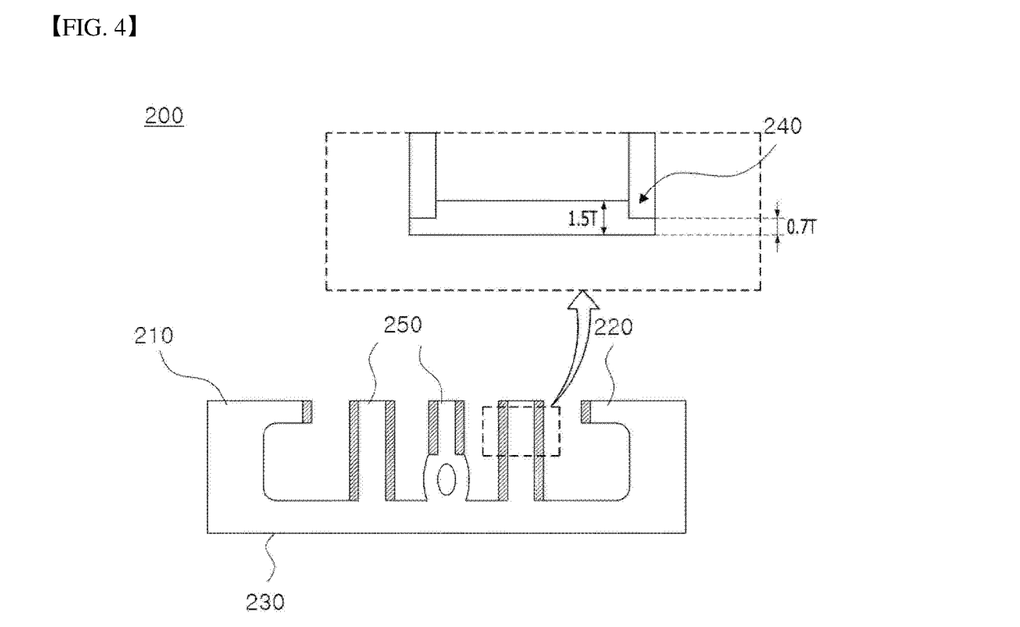

FIGS. 3 to 4 are schematic diagrams of a shim for a die coater according to another embodiment of the present invention.

Referring to FIGS. 3 and 4, the shim 200 for the die coater according to the present invention includes at least one sub-guide 250 which is located between the first and second guides 210 and 220 and divides the discharge line. It is illustrated that there are 3 sub-guides 250, but the present invention is not limited to this example. If 3 sub-guides 250 are included between the first and second guides 210 and 220, the shim 200 for a die coater according to the present invention may form 4 discharge lines.

Further, sub-guides 250 are included between the first and second guides 210 and 220 in order to alternately stripe-coating the coated part and the non-coated part at the time of coating slurry.

The sub-guide 250 has a step 240 along the discharge line of the slurry. Specifically, the sub-guide 250 has a step 240 formed on the boundary surface with the discharge line of slurry, and when slurry is discharged, the step 240 is formed on the side surface of the sub-guide 250 contacting the slurry. Namely, the thickness of the boundary surface with the discharge line is set to be smaller than the entire thickness of the sub-guide 250. This is to smoothly apply slurry on the edge portion when coating slurry as in the first and second guides 210 and 220.

The sub-guide 250 has a step 240 at a portion corresponding to 3/10 to 6/10 of an entire thickness of the sub-guide 250. Specifically, in the sub-guide 250 of the shim 200 for a die coater according to the present invention, an average thickness of regions where a step 240 is not formed is 1.5 mm, and an average thickness of regions where a step 240 is formed is 0.7 mm. However, the present invention is not limited thereto. Since the first and second guides 210 and 220 were explained above, the detailed description for the first and second guides 210 and 220 is omitted here.

Namely, the sub-guide 250 of the shim 200 for a die coater according to the present invention can control the length and shape of the edge portion of the slurry coated on the electrode current collector by making the thickness of the boundary surface of the slurry discharge line. As such, the NP ratio reversal risk, etc. can be reduced by increasing the length of the coating boundary surface of slurry.

Third Embodiment

Figure 5A:
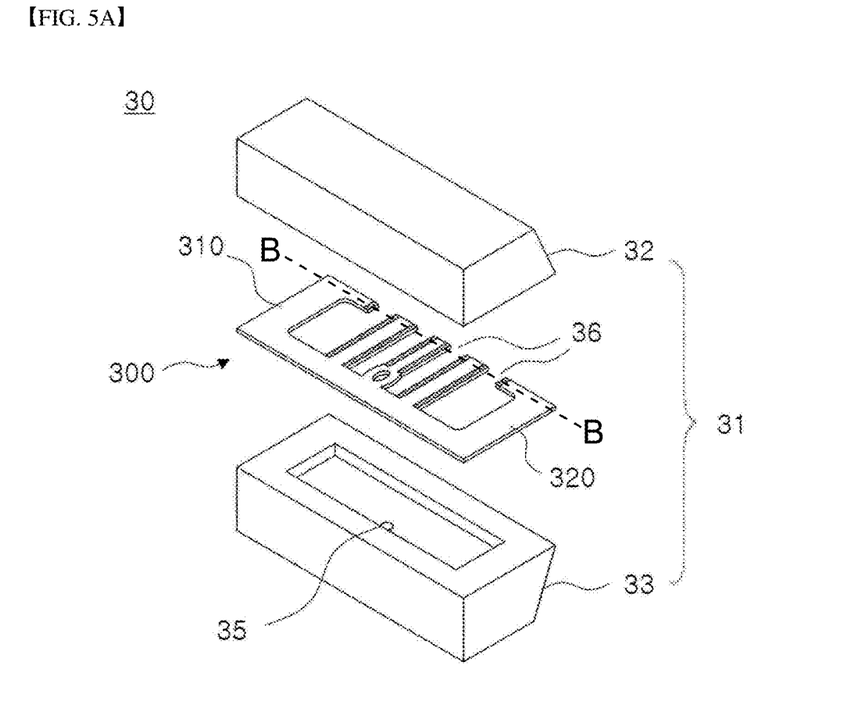
FIG. 5A is an exploded perspective view of a die coater according to one embodiment of the present invention.
Figure 5B:
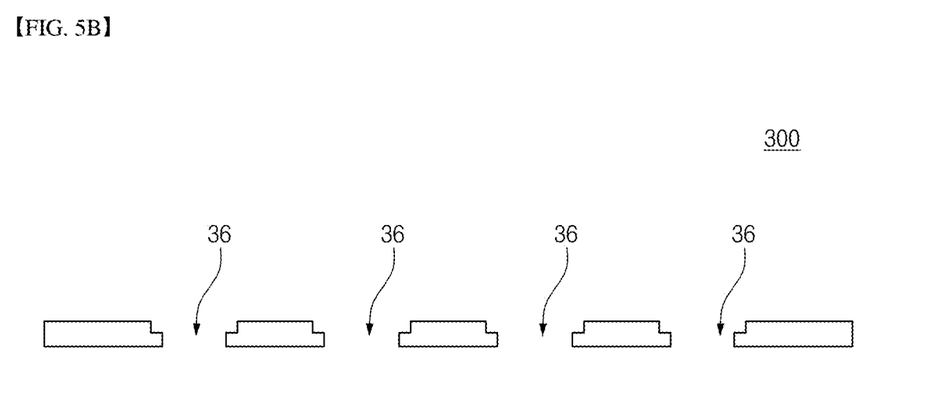
FIG. 5B is a cross-section view of the shim of FIG. 5A through the line B-B.

FIG. 5A is an exploded perspective view of a die coater according to one embodiment of the present invention. FIG. 5B is a cross-section view of the shim of FIG. 5A through the line B-B. Referring to FIGS. 5A and 5B, a die coater 30 according to the present invention includes: a body 31 which has an inner space for accommodating a slurry; a supply port 35 through which a slurry is supplied to the inner space 34; and a discharge port 36 through which a slurry is discharged from the inner space 34 to an electrode current collector. Herein, the shim 300 for the die coater may be detachably installed at the inner space of the die coater 30.

First, the body of the die coater 30 includes an upper die 32 and a lower die 33. The upper and lower dies 32 and 33 have a symmetrical prismoid shape, and may be assembled as one surface of the upper and lower dies 32 and 33, which is the bottom surface of the prismoid, faces each other.

Further, the lower die 33 may include a supply port 35 through which a slurry is supplied from an external side. The slurry, which is supplied from the external side through the supply port 35, may be stored in an inner space 34 formed in the lower die 33.

Further, a shim 300 for a die coater is interposed between the upper die 32 and the lower die 33. The slurry discharge line is formed at the inside of the die coater 30 as the upper die 32 and the lower die 33 are spaced apart from each other by the thickness of the shim 300 for a die coater. Slurry supplied from the supply port flows in the die coater along the discharge line and is discharged to the outside through the discharge port.

Further, as described above, the shim 300 for a die coater includes a first guide 310, a second guide 320, and a sub-guide 350 where a step 340 is formed along the discharge line, to thereby control the length and shape of the edge portion of the slurry. Since the first and second guides 310 and 320 were explained above, the detailed description for the first and second guides 310 and 320 is omitted here.

Experimental Example

Figure 6:
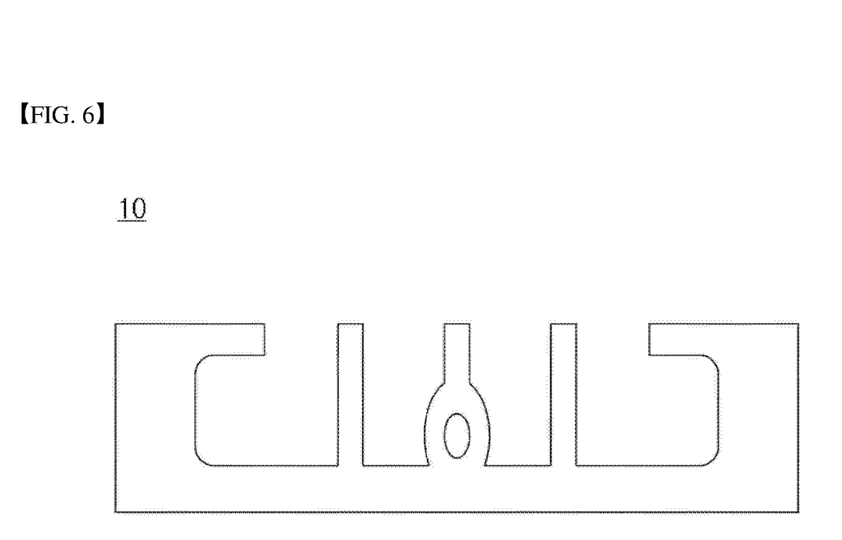
FIG. 6 is a schematic diagram of a die coater used in a comparative example.

A positive electrode was manufactured using the die coater of FIG. 5A (example 1). Specifically, slurry was applied on an aluminum current collector by supplying positive electrode slurry to a die coater, and the slurry was applied on the top surface and the back surface of the current collector. Further, as a comparative example, a positive electrode was manufactured using a die coater including the shim 10 for a die coater of FIG. 6 in the same manner as in example 1 (comparative example 1).

Figure 7:
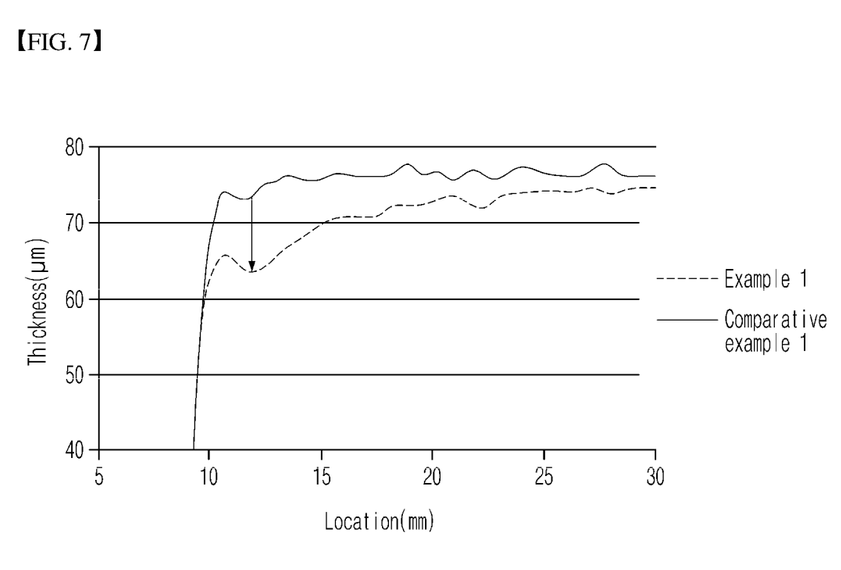
FIG. 7 is a graph showing the thickness by positions of the positive electrode manufactured according to Example 1 and in Comparative Example 1.

And the result is shown in FIG. 7 and Table 1.

FIG. 7 is a graph showing the thickness by positions of the positive electrode manufactured according to Example 1 and in Comparative Example 1. Referring to FIG. 7, in the case of the example 1, the thickness of slurry decreases toward the edge region. Particularly, in the example 1, the side ring phenomenon of the back surface was improved, compared to the comparative example 1.

TABLE 1

| | Sliding | 1st lane (left) | 1st lane (right) | 2nd lane (left) | 2nd lane (right) | 3rd lane (left) | 3rd lane (right) | 4th lane (left) | 4th lane (right) | Average |
|---|---|---|---|---|---|---|---|---|---|---|
| Example 1 | Top | 6.06 | 5.86 | 5.03 | 5.23 | 5.84 | 5.74 | 5.35 | 6.04 | 5.64 |
| | Back | 6.75 | 6.55 | 4.18 | 6.02 | 4.97 | 4.88 | 5.67 | 5.98 | 5.63 |
| Comparative Example 1 | Top | 3.93 | 4.14 | 3.86 | 3.96 | 4.07 | 3.97 | 4.66 | 3.77 | 4.05 |
| | Back | 2.39 | 3.48 | 3.09 | 3.39 | 4.19 | 3.29 | 2.38 | 3.18 | 3.17 |

Referring to Table 1, the sliding length of a die coater, to which a shim for a die coater according to the present invention has been applied, was about 5 to 6 mm. It is seen that the sliding length has been improved by smoothly coating slurry on the edge portion of the current collector. In Table 1, lane (left) and lane (right) mean the left edge region and the right edge region of slurry coated in a stripe form.

On the other hand, in the case of the comparative example 1, the sliding length was about 2 to 3 mm. Particularly, the top surface of the comparative example 1 is in a level in which the NP ratio is reversed, and it is predicted that the swelling of the thickness according to the NP ratio reversal will occur.

Further, a positive electrode was manufactured in the same manner as in the example 1 except that the type and composition of the positive electrode slurry were set to be different from those of the example 1. And the result is shown in Table 2.

TABLE 2

| | Sliding | 1st lane (left) | 1st lane (right) | 2nd lane (left) | 2nd lane (right) | 3rd lane (left) | 3rd lane (right) | 4th lane (left) | 4th lane (right) | Average |
|---|---|---|---|---|---|---|---|---|---|---|
| Example 2 | Top | 6.45 | 5.96 | 5.04 | 5.24 | 5.64 | 4.95 | 5.60 | 5.90 | 5.55 |
| | Back | 7.12 | 5.73 | 4.84 | 6.72 | 6.16 | 6.95 | 6.76 | 6.36 | 6.33 |
| Example 3 | Top | 5.70 | 5.80 | 6.07 | 5.76 | 5.37 | 4.97 | 5.69 | 5.89 | 5.62 |
| | Back | 5.76 | 5.07 | 5.63 | 5.63 | 6.00 | 7.20 | 7.97 | 4.88 | 6.18 |
| Example 4 | Top | 5.86 | 6.15 | 4.88 | 6.18 | 4.86 | 5.65 | 4.99 | 7.13 | 5.51 |
| | Back | 7.02 | 5.44 | 5.16 | 5.36 | 5.65 | 5.84 | 6.95 | 5.86 | 5.92 |

Referring to Table 2, when manufacturing a positive electrode with a die coater to which a shim for a die coater according to the present invention has been applied, the sliding length has been improved to a 5 to 6 mm level from a 2 to 3 mm level.

Namely, it is possible to control the length and shape of the edge portion of slurry coated on the electrode current collector by applying the shim for a die coater according to the present invention at the time of manufacturing an electrode. As such, the NP ratio reversal risk, etc. can be reduced by increasing the length of the coating boundary surface of slurry. In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

1: shim for die coater
10, 30: die coater
11, 31: body
12, 32: upper die
13, 33: lower die
14, 34: inner space
15, 35: supply port
16, 36: discharge port
100, 200, 300: shim for die coater
100, 210, 320: first guide
120, 220, 320: second guide
130, 230, 330: base
140, 240, 340: step
250, 350: sub-guide

The invention claimed is:

1. A shim for a die coater configured to apply a slurry on an electrode current collector, the shim comprising:
a base extending in a longitudinal direction of the shim; and
first and second guides each having a bent shape, the first and second guides each having a connecting portion extending from respective first and second opposite ends of the base in a lateral direction of the shim perpendicular to the longitudinal direction, the first and second guides having first ends extending towards one another in the longitudinal direction and defining an opening therebetween,
wherein the first and second guides each have a step at the first end thereof adjacent the opening, the opening configured to receive a discharge line of a slurry therethrough, each of the first and second guides having a first average thickness in regions where the step is not formed and a second average thickness in regions where the step is formed, the second average thickness being less than the first average thickness, the first average thickness and the second average thickness being in a height direction of the shim perpendicular to the longitudinal direction and the lateral direction.

2. The shim of claim 1, wherein the second average thickness of the step of each of the first and second guides is 3/10 to 6/10 of the first average thickness of each of the first and second guides in regions where the step is not formed.

3. The shim of claim 1, wherein in the first and second guides, the first average thickness of regions where the step is not formed is in a range of 1 to 2 mm, and the second average thickness of regions where the step is formed is in a range of 0.4 to 0.9 mm.

4. The shim of claim 1, further comprising at least one sub-guide extending from the base towards the opening in the lateral direction, each of the at least one sub-guide being located between the first and second guides, the at least one sub-guide dividing the opening into a plurality of parts.

5. The shim of claim 4, wherein each of the at least one sub-guide has a step along the opening of the shim, each of the at least one sub-guide having the first average thickness in regions where the step is not formed and the second average thickness in regions where the step is formed.

6. The shim of claim 5, wherein the second average thickness of the step of each of the at least one sub-guide is 3/10 to 6/10 of the first average thickness of each of the at least one sub-guide in regions where the step is not formed.

7. The shim of claim 5, wherein in each of the at least one sub-guide, the first average thickness of regions where the step is not formed is in a range of 1 to 2 mm, and the second average thickness of regions where the step is formed is in a range of 0.4 to 0.9 mm.

8. A die coater including the shim according to claim 1.

9. The die coater of claim 8, further comprising:
a body which has an inner space configured to accommodate a slurry therein;
a supply port configured to supply a slurry therethrough to the inner space; and
a discharge port configured to receive a discharge of the slurry from the inner space therethrough to an electrode current collector,
wherein the shim is detachably installed at the inner space of the die coater.

10. A lithium secondary battery comprising:
a positive electrode in which a positive electrode slurry is disposed on a positive electrode current collector;
a negative electrode in which a negative electrode slurry is disposed on a negative electrode current collector; and
a separator interposed between the positive electrode and the negative electrode,
wherein a thickness difference between a central portion of the positive electrode slurry and an edge portion of the positive electrode slurry along a cross section of the positive electrode in a width direction of the positive electrode is 10% or more,
wherein a thickness difference between a central portion of the negative electrode slurry and an edge portion of the negative electrode slurry along a cross-section of the positive electrode in a width direction of the negative electrode is 5% or less,
wherein the edge portion of the positive electrode slurry has a sliding length of 5-7 mm, the sliding length being a region of decreasing thickness of the edge portion relative to the thickness of the central portion thereof in a direction away from the central portion, and
wherein a ratio of a thickness of the edge portion of the positive electrode slurry to a thickness of the central portion of the positive electrode slurry is in a range of 80 to 90%.

11. The lithium secondary battery of claim 10, wherein a ratio of the thickness of the edge portion of the positive electrode slurry to a thickness of the central portion of the negative electrode slurry is in a range of 95 to 105%.

* * * * *